United States Patent [19]

Holleck et al.

[11] Patent Number: 4,816,358

[45] Date of Patent: Mar. 28, 1989

[54] ELECTROCHEMICAL CELL

[75] Inventors: Gerhard L. Holleck, Wayland; Trung Nguyen, Norton, both of Mass.

[73] Assignee: EIC Laboratories, Inc., Norwood, Mass.

[21] Appl. No.: 120,391

[22] Filed: Nov. 12, 1987

[51] Int. Cl.[4] ...................... H01M 4/62; H01M 10/40
[52] U.S. Cl. ..................................... 429/194; 429/218; 429/209
[58] Field of Search ............... 429/194, 142, 247, 248, 429/197, 218

[56] References Cited

U.S. PATENT DOCUMENTS 4,091,191 5/1978 Gaines .................................. 429/194
4,489,144 12/1984 Clark .................................... 429/197

OTHER PUBLICATIONS

Rauh et al., *J. Inorg. Nucl. Chem.*, "Formation of Lithium Polysulfides in Aprotic Media", vol. 39, pp. 1761–1766 (1977).

Rauh et al., *J. of Electrochem. Society*, "A Lithium/Dissolved Sulfur Battery with an Organic Electrolyte", vol. 126, pp. 523–527 (4/79).

Rao et al., *J. Electrochem. Society*, "Effect of Sulfur Impurities on Li/TiS$_2$ Cells", vol. 128, pp. 942–945 (5/81).

*Primary Examiner*—Donald L. Walton
*Attorney, Agent, or Firm*—Charles Hieken

[57] ABSTRACT

Disclosed is an electrochemical cell that includes an anode, a cathode, and an electrolyte, the cathode containing more than a trace amount of a sulfur impurity capable of causing the cell to self-discharge and also containing a scavenger that reacts with the impurity to reduce the rate of self-discharge of the cell.

35 Claims, 1 Drawing Sheet

ELECTROCHEMICAL CELL

BACKGROUND OF THE INVENTION

The invention relates to electrochemical cells.

A current producing electrochemical cell has to satisfy many requirements in order to be of wide ranging practical value. One such requirement is a long shelf life, that is, the cell must show a negligible rate of self-discharge. While this is quite obvious for primary cells, it is also true of secondary or rechargeable cells.

One type of modern high energy density cell makes use of alkali metal anodes, non-aqueous electrolytes, and transition metal sulfide cathodes. The latter are solid compounds which upon reduction incorporate the alkali metal without substantial structural changes. A sepecific example of this type of cell would be a Li/2-MeTHF-THF-LiAsF$_6$/TiS$_2$ cell, for which the reaction can be written as follows:

$$xLi + TiS_2 \rightarrow Li_xTiS_2 \ (0 < x < 1) \ E \sim 2.1V$$

In the above cell the listed reactants are completely insoluble in the electrolyte, and therefore one would expect to see no self-discharge reactions and, accordingly, the cell should have a practically indefinite shelf life.

Rao et al., 128 J. Electrochem. Soc. 942 (1981), discuss how an electrochemical cell having a lithium anode, a titanium disulfide cathode, and an aprotic organic electrolyte can self-discharge if the cathode contains a sulfur impurity such as elemental sulfur or hydrogen sulfide. According to Rao et al., such impurities may be introduced as a byproduct in the production of TiS$_2$ and through the handling of the TiS$_2$ in a non-inert environment during cell assembly.

SUMMARY OF THE INVENTION

In general, the invention features, in one aspect, an electrochemical cell that includes an anode, a cathode, and an electrolyte, the cathode containing more than a trace amount of a sulfur impurity capable of causing the cell to self-discharge and also containing a scavenger that reacts with the impurity to reduce the rate of self-discharge of the cell.

In another aspect, the invention features an electrochemical cell that includes an anode, a cathode, an electrolyte, and a scavenger that reacts with a sulfur impurity capable of causing the cell to self discharge, the scavenger being in contact with the electrolyte and being substantially separate from the cathode. By substantially separate, it is meant that the scavenger is either not in physical contact with the cathode or is in contact with only the outer surface of the cathode.

In another aspect, the invention features an electrochemical cell that includes an anode, a cathode, and an electrolyte, the cathode containing a scavenger capable of reacting with a sulfur impurity capable of causing the cell to self discharge, the cathode including less then 5% of the scavenger by weight.

In preferred embodiments, the anode includes an alkali metal (e.g., lithium, sodium, or potassium), the cathode includes a transition metal sulfide (e.g., TiS$_2$, TiS$_3$, MoS$_2$, MoS$_3$, NbS$_2$, NbS$_3$, V$_2$S$_5$, or V$_x$Cr$_{1-x}$S$_2$), and the electrolyte includes an aprotic organic solvent (e.g., dioxolane, tetrahydrofuran, dimethoxyethane) and an alkali metal salt such as LiAsF$_6$, LiClO$_4$, or LiPF$_6$.

In other preferred embodiments, the scavenger is a metal or salt thereof and makes up less than 10% (more preferably less than 5%) of the cathode by weight. Preferred metals include titanium, vanadium, niobium, molybdenum, chromium, manganese, iron, copper, nickel, cobalt, silver, cadmium, mercury, aluminum, tin, lead, arsenic, antimony, and zinc.

In other preferred embodiments, the sulfur impurity is elemental sulfur, hydrogen sulfide, or a polysulfide, and the impurity makes up greater than 0.01% and less than 2% of the cathode by weight.

The electrochemical cells of the invention, because of the presence of the sulfur scavenger, are inhibited from self discharging and thus have an increased shelf-life. The scavenger is simple to add during manufacturing, and, because of its presence, not as much care need be taken during the manufacturing process to avoid generating sulfur impurites.

Other features and advantages of the invention will be apparent from the following description of the preferred embodiment thereof, and from the claims.

DESCRIPTION OF THE PREFERRED EMBODIMENT

The Figures will be described first.

Figures

Structure

Figure 1:
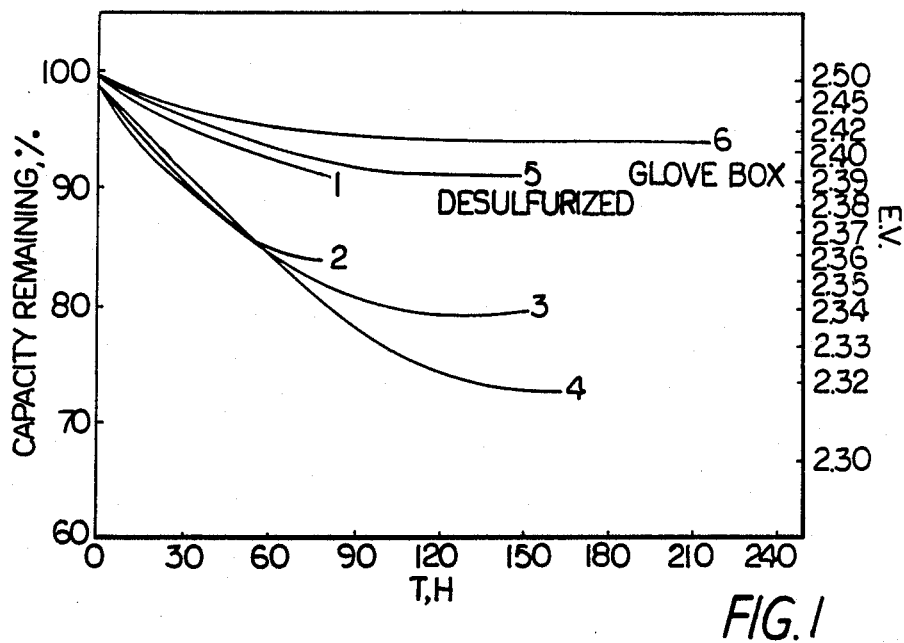
FIG. 1 is a graph of the open circuit voltages of six electrochemical cells plotted against time.

The preferred electrochemical cells have alkali metal anodes, transition metal sulfide cathodes that include a sulfur scavenger, and an electrolyte consisting of an aprotic organic solvent containing an alkali metal salt.

The preferred transition metal sulfides, aprotic organic solvents, and alkali metal salts are described in the Summary of the Invention. Other examples of aprotic organic solvents that can be used as the electrolyte include dimethylsulfoxide and dimethylformamide.

The preferred sulfur scavengers are metal powders or metal ion supplying compounds (salts) which form stable sulfides. In particular, this includes the transition metals of groups Va, VIa, VIIa, VIIIa, Ib, and IIb; and the metals of groups IIIb, IVb, and Vb of the Periodic Table of the Elements. Specific examples of the metals are iven in the Summary of the Invention. Alloys of the metals may be used. Examples of inorganic salts of these metals that can be used as sulfur scavengers include the halide salts CuCl$_2$, PbCl$_2$, and Hg$_2$Cl$_2$.

There are two general ways sulfur impurities end up in a transition metal sulfide cathode. The first is through sulfur impurities (e.g., elemental S) that are present in the TiS$_2$ from which the cathode is constructed; care can be taken to avoid these impurities by properly purifying the TiS$_2$ (e.g., by vacuum sublimation or solvent extraction) prior to cell production. The second way is through exposure of the TiS$_2$ to moisture-containing air during construction of the cell; the moisture hydrolyzes TiS$_2$ to yield H$_2$S. Care can be taken to avoid these impurities by never handling the TiS$_2$ outside of an inert environment.

Once present, the sulfide impurities become part of a polysulfide shuttle. Sulfide ions or low chain polysulfides are oxidized at the cathode to higher polysulfides which are soluble in the electrolyte. These higher polysulfides diffuse to the anode where they are reduced to lower polysulfides which in turn diffuse back to the cathode to be reoxidized (at potentials above 2.3 V vs. Li). Thus this redox shuttle causes a continuous current flow in the cell, resulting in a depletion of the cell's storage capacity. Elemental sulfur also initiates the shuttle. Sulfide impurities present in even lower amounts, e.g., 0.01%, cause significant self-discharge of the cell.

The addition to the cathode of a metal that reacts with the sulfur impurities to form stable complexes interrupts the polysulfide shuttle. The exact composition of the effective sulfur complexes (those that are stable within the potential range that polysulfide formation occurs, >2.3 V vs. Li) is not established; they may significantly deviate from the stoichiometry of simple metal sulfides and may contain polysulfide units. Accordingly, some metal scavengers are effective in amounts smaller than those expected from the stoichiometry of that metal's most stable sulfides.

The cathode of the preferred cells should contain between 90 and 99.5% (more preferably between 95 and 99.5%) transition metal sulfide by weight; the greater the percentage of transition metal sulfide, the higher the energy density of the cell. The cathode should also contain less than 10% (more preferably less than 5%) scavenger by weight. Greater amounts of scavengers can adversely affect the energy density of the cell.

The following examples demonstrate the self-discharge problem arising from sulfur impurities.

EXAMPLE 1

New cells consisting of a Li anode, a $TiS_2$ cathode, and a 2MeTHF/THF/2MeF/LiAsF$_6$ electrolyte show open circuit voltages of about 3 V directly after filling with electrolyte. This voltage is quite stable and can be maintained for days. After discharge (e.g., to 1.6 V) and recharge (e.g., to 2.7 V), the open circuit voltage is ~2.5 V. Upon open circuit stand the cell voltage and the available capacity decrease.

Characteristic open circuit voltages and capacities as a function of time for six cells are shown in FIG. 1. One way of minimizing the self-discharge problem is to process the cell under optimal conditions so that the amount of sulfur impurities is kept to trace levels, i.e., the lowest possible level achievable under optimal processing conditions. Referring to FIG. 1, cell 6 was constructed under such conditions; the free sulfur contaminants had been removed by vacuum sublimation, and the cell was constructed in the inert environment of an argon filled glove box. The capacity of cell 6 (which contained only trace amounts of sulfur impurities) quickly reached a stable plateau.

Cells 1-4 were made from $TiS_2$ that had not been purified to remove sulfur impurities, and were constructed in a dry room environment that had a low moisture content in the atmosphere but higher than that in a glove box. As a result of these processing conditions, all four cells had greater than trace amounts of sulfur impurities in their cathodes, and all lost a substantial part of their available capacity within one week.

Cell 5 contained $TiS_2$ from which sulfur contaminants had been removed by vacuum sublimation, but was constructed in a dry room (like cells 1-4). Because there was a small amount of moisture in the dry room atmosphere, cell 5 also contained greater than trace amounts of sulfur contaminants, although not as much as cells 1-4. Cell 5 also lost a substantial amount of its available capacity within a week.

Advantageously the invention avoids the need for rigorous processing and provides a practical way of reducing the self discharge attributable to sulfur impurities.

EXAMPLE 2

Example 2 demonstrates the effectiveness of the preferred sulfur impurity scavengers.

Cells consisting of one cathode faced on both sides by anodes were constructed. Each electrode was surrounded by a sealed microporous polypropylene separator (Celgard 2400). The entire package was enclosed in a non-porous polypropylene bag, sandwiched under moderate compression between stainless steel hemicylinders and inserted into a cylindrical D-size nickel can. The can was then hermetically closed with a cover containing insulated feedthroughs for electrical connections and a fill tube. The cells were activated by introducing electrolyte consisting of 48.5% THF, 48.5% 2MeTHF, 3% 2MeF and 1.5 M LiAsF$_6$ into the evacuated container.

The active electrode area was 20 cm$^2$. The anodes consisted of 0.025 cm lithium foil pressed onto an expanded nickel screen. The cathodes were fabricated by pressing an intimate mix of y % $TiS_2$ powder, 1% S and 99-y % additive onto an expanded nickel mesh. Sulfur was intentionally added to these cells to demonstrate the effect of additives. Here, the metal additive "y" was Cu, Mo, Ni, Pb or Fe in the form of fine powders with approximate surface areas of 2 to 4 m$^2$/g. The cathodes contained approximately 0.91 g $TiS_2$, equivalent to a theoretical capacity of 170 mAh.

Following activation, the cells were twice discharged to 1.6 V at 1.4 mA/cm$^2$ and recharged at 0.7 mA/cm$^2$ to 2.7 V. Then the cells were placed on open circuit stand and the voltage as a function of time was monitored. The results are shown in FIG. 2.

Figure 2:
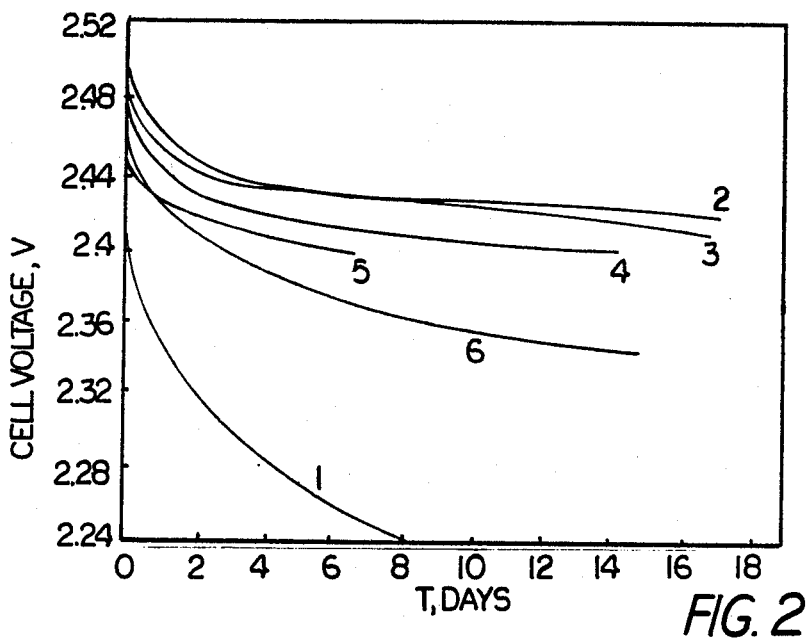
FIG. 2 is a graph of the open circuit voltages of six electrochemical cells plotted against time.

The cell containing sulfur but not any additive experienced a quick drop in open circuit potential which can be directly correlated with the remaining cell capacity (FIG. 2, trace 1). After three days only about 60% of the capacity remained. Cells containing additions of 2% Cu, 1.5% Mo, 6.5% Pb, and 1.8% Ni, represented in FIG. 2 by traces 2 to 5 respectively, retained over 90% of their original capacity after a 13 to 16 day stand. In this test, a 1.7% Fe addition (trace 6) resulted in over 80% capacity retention. Thus it is apparent that metal additives are effective in reducing the rate (by at least 50%) of self-discharge in the $LiTiS_2$ cells whose cathodes contain a sulfur impurity.

EXAMPLE 3

Li/$TiS_2$ cells containing intentionally added sulfur and sulfur scavengers were constructed and activated as described in Example 2. The cells were discharged at 1.4 mA/cm$^2$ to 1.6 V and then recharged to 2.7 V. Subsequently, the cells were potentiostatically held at various potentials until the current reached a constant value (typically 10 to 20 h). This constant current is the result of the redox shuttle based on sulfur and thus represents a direct measure of the self-discharge current. The results are summarized in Table 1. It can be seen that the magnitude of the self-discharge current depends on the cell potential and that it decreases with decreasing voltage. The addition of 1% S to TiS$_2$ results in a current of 2.3 to 3.3 mA at 2.5 V.

Table 1 illustrates the effectiveness of a variety of cathode additives in dramatically reducing the measured sulphur shuttle currents. The data also shows that some additives were immediately effective (e.g, Ag, Cu) while others required a second discharge-charge cycle before the current decreased dramatically (e.g., Ni, Mo, Fe, Pb, Co, Al). The results in Table 1 show further that it was not necessary to introduce the additive in elemental form. Metal halides were equally effective even though their introduction into practical cells may be less desirable. In most experiments, the mole ratio of metal to sulfur was chosen at 1 to 1; however, lower metal amounts are also effective (e.g., the 0.8% Ag level corresponds to a Ag/S ratio of 0.25).

OTHER EMBODIMENTS

Other embodiments are within the following claims. For example, the sulfur impurity scavengers used in Examples 2 and 3 would also be effective in reducing the rate of self discharge in cells 1–5 of Example 1 where sulfur impurities are not added intentionally.

Figure 3:
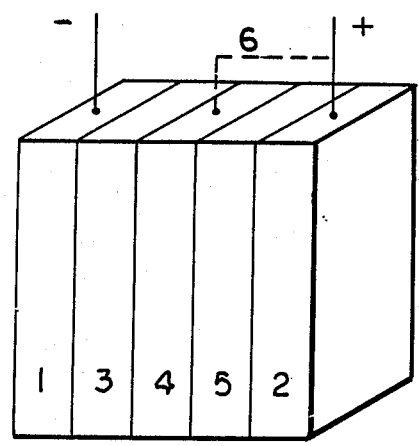
FIG. 3 is a battery.

The sulfur scavenger can be separate from the cathode, so long as the scavenger is in contact with the electrolyte so that it can react with the sulfur impurities involved in the polysulfide shuttle. An example of such an arrangement is illustrated in FIG. 3. A battery consists of an anode 1 and a cathode 2 which are electronically isolated from each other by separators 3 and 5. The sulfur scavenger 4 is placed between separators 3 and 5.

TABLE 1

STEADY-STATE CURRENTS IN Li/TiS$_2$ CELLS CONTAINING CATHODES WITH DIFFERENT ADDITIVES

| Cathode Composition (wt %) | Cell Capacity (mA/hr) | Steady-State Current in MA at 2.6 V | 2.5 V | 2.4 V | 2.3 V |
|---|---|---|---|---|---|
| TiS$_2$:S (99:1) | 194 | | 2.3 | 0.9 | 0.4 |
| TiS$_2$:S (99:1) | 172 | | 3.3 | 1.1 | 0.5 |
| TiS$_2$:TS720:TFE:Ag:S (89.7:2.6:5.1:1.6:1) | 210 | 0.26 | 0.3 | 0.1 | −0.2 |
| TiS$_2$:Ag:S (97.3:1.7:1) | 172 | 0.02 | 0.02 | | −0.03 |
| TiS$_2$:Ag:S (98.2:0.8:1) | 194 | | 0.4 | 0.0 | |
| TiS$_2$:Cu:S (97.2:1) | 176 | 0.07 | 0.01 | 0.0 | −0.01 |
| TiS$_2$:Ni:S (97.2:1.8:1) | 146 Second cycle | 2.5 | 0.2 | 0.1 | 0.05 |
| TiS$_2$:Mo:S (97.5:1.5:1) | 171 Second cycle | 1.5 | 1 −0.01 | 0.2 −0.04 | 0.05 |
| TiS$_2$:Fe:S (97.3:3:1.7:1) | 167 Second cycle | | 2 0.04 | 1.5 −0.1 | 0.5 −0.1 |
| TiS$_2$:Pb:S (92.4:6.6:1) | 153 Second cycle | | 1.6 −0.01 | 1.1 −0.06 | 0.2 −0.1 |
| TiS$_2$:Al:S (97.3:1.7:1) | 170 | | 0.3 | 0.1 | −0.01 |
| TiS$_2$:Co:S (97.1:1.9:1) | 155 Second cycle | | 0.7 0.1 | 0.2 0.1 | 0.1 0.01 |
| TiS$_2$:Mn:S (97.3:1.7:1) | 161 Second cycle | | 1 0.6 | 0.3 0.3 | 0.1 0.1 |
| TiS$_2$:CuCl$_2$:S (95:1:4) | 186 | | 0.3 | 0.2 | 0.1 |
| TiS$_2$:PbCl$_2$:S (90.3:8.7:1) | 164 | | 0.1 | 0.0 | −0.1 |
| TiS$_2$:Hg$_2$Cl$_2$:S (84.3:14.7:1) | 156 | | 0.4 | 0.35 | — |

The scavenger may take the form of a screen or a power to allow ion migration between the anode and the cathode when the electrolyte is added to the battery. Optionally the scavenger can be electrically connected to the cathode by a shunt 6, in which case the separator 5 is not necessary.

We claim:

1. A rechargeable electrochemical cell comprising an anode, a cathode, and an electrolyte, said cathode comprising more than a trace amount of a sulfur impurity capable of causing said cell to self-discharge, and a scavenger that reacts with said impurity to form a stable complex to reduce the rate of self-discharge of said cell.

2. The electrochemical cell of claim 1 wherein said anode comprises an alkali metal.

3. The electrochemical cell of claim 2 wherein said anode comprises lithium metal.

4. The electrochemical cell of claim 1 wherein said cathode comprises a transition metal sulfide.

5. The electrochemical cell of claim 4 wherein said transition metal sulfide is selected from the group consisting of TiS$_2$, TiS$_3$, MoS$_2$, MoS$_3$, NbS$_2$, NbS$_3$, V$_2$S$_5$, and V$_x$Cr$_{1-x}$S$_2$.

6. The electrochemical cell of claim 1 wherein said electrolyte comprises an aprotic organic solvent and an alkali metal salt.

7. The electrochemical cell of claim 1 wherein said scavenger comprises a metal of Groups VA, VIA, VIIA, VIIIA, Ib, IIb, IIIb, IVb, or Vb of the Periodic Table of Elements, or a salt thereof.

8. The electrochemical cell of claim 7, said scavenger being characterized in that it is reactive with sulfide ion or polysulfide.

9. The electrochemical cell of claim 1 wherein said scavenger is selected from the group consisting of titanium, vanadium, niobium, molybdenum, chromium, manganese, iron, copper, nickel, cobalt, silver, cadmium, mercury, aluminum, tin, lead, arsenic, antimony, zinc, salts of titanium, salts of vanadium, salts of niobium, salts of molybdenum, salts of chromium, salts of manganese, salts of iron, salts of copper, salts of nickel, salts of cobalt, salts of silver, salts of cadmium, salts of mercury, salts of aluminum, salts of tin, salts of lead, salts of arsenic, salts of antimony, salts of zinc, alloys comprising titanium, alloys comprising vanadium, alloys comprising niobium, alloys comprising molybdenum, alloys comprising chromium, alloys comprising manganese, alloys comprising iron, alloys comprising copper, alloys comprising nickel, alloys comprising cobalt, alloys comprising silver, alloys comprising cadmium, alloys comprising mercury, alloys comprising aluminum, alloys comprising tin, alloys comprising lead, alloys comprising arsenic, alloys comprising antimony, and alloys comprising zinc.

10. The electrochemical cell of claim 9 wherein said metal is aluminum.

11. The electrochemical cell of claim 1 wherein said cathode comprises sufficient scavenger to react with essentially all of said sulfur impurities.

12. The electrochemical cell of claim 1 wherein said scavenger comprises less than 10% of said cathode by weight.

13. The electrochemical cell of claim 1 wherein said sulfur impurity comprises at least 0.01% of said cathode by weight.

14. The electrochemical cell of claim 1 wherein said sulfur impurity comprises elemental sulfur.

15. The electrochemical cell of claim 1 wherein said sulfur impurity comprises hydrogen sulfide.

16. The electrochemical cell of claim 1 wherein said sulfur impurity comprises a polysulfide.

17. A rechargeable electrochemical cell comprising an anode, a cathode, and an electrolyte,
said cathode comprising a scavenger capable of reacting with a sulfur impurity capable of causing said cell to self-discharge to form a stable complex,
said scavenger comprising less than 5% of said cathode by weight.

18. The electrochemical cell of claim 17 wherein said anode comprises an alkali metal.

19. The electrochemical cell of claim 17 wherein said cathode comprises a transition metal sulfide.

20. The electrochemical cell of claim 19 wherein said transition metal sulfide is selected from the group consisting of $TiS_2$, $TiS_3$, $MoS_2$, $MoS_3$, $NbS_2$, $NbS_3$, $V_2S_5$ and $V_xCr_{1-x}S_2$.

21. The electrochemical cell of claim 18 wherein said electrolyte comprises an aprotic organic solvent and an alkali metal salt.

22. The electrochemical cell of claim 17 wherein said scavenger comprises a metal of Groups VA, VIA, VIIA, VIIIA, Ib, IIb, IIIb, IVb, or Vb of the Periodic Table of Elements, or a salt thereof.

23. The electrochemcial cell of claim 22, said scavenger being characterized in that it is reactive with sulfide ion or polysulfide.

24. The electrochemical cell of claim 17 wherein said metal is selected from the group consisting of titanium, vanadium, niobium, molybdenum, chromium, manganese, iron, copper, nickel, cobalt, silver, cadmium, mercury, aluminum, tin, lead, arsenic, antimony, and zinc, salts of titanium, salts of vanadium, salts of niobium, salts of molybdenum, salts of chromium, salts of manganese, salts of iron, salts of copper, salts of nickel, salts of cobalt, salts of silver, salts of cadmium, salts of mercury, salts of aluminum, salts of tin, salts of lead, salts of arsenic, salts of antimony, salts of zinc, alloys comprising titanium, alloys comprising vanadium, alloys comprising niobium, alloys comprising molybdenum, alloys comprising chromium, alloys comprising manganese, alloys comprising iron, alloys comprising copper, alloys comprising nickel, alloys comprising cobalt, alloys comprising silver, alloys comprising cadmium, alloys comprising mercury, alloys comprising aluminum, alloys comprising tin, alloys comprising lead, alloys comprising lead, alloys comprising arsenic, alloys comprising antimony, and alloys comprising zinc.

25. The electrochemical cell of claim 24 wherein said metal is aluminum.

26. The electrochemical cell of claim 17 wherein said sulfur impurity comprises elemental sulfur.

27. The electrochemical cell of claim 17 wherein said sulfur impurity comprises hydrogen sulfide.

28. The electrochemical cell of claim 17 wherein said sulfur impurity comprises a polysulfide.

29. An rechargeable electrochemical cell comprising an anode, a cathode, an electrolyte, and a scavenger that reacts with a sulfur impurity capable of causing said cell to self-discharge to form a stable complex,
said scavenger being in contact with said electrolyte and being substantially separate from said cathode.

30. The electrochemical cell of claim 29 wherein said anode comprises an alkali metal.

31. The electrochemical cell of claim 29 wherein said cathode comprises a transition metal sulfide.

32. The electrochemical cell of claim 29 wherein said scavenger comprises a metal of Groups VA, VIA, VIIA, VIIIA, Ib, IIb, IIIb, IVb, or Vb of the Periodic Table of Elements, or a salt thereof 33. The electrochemcial cell of claim 32, said scavenger being characterized in that it is reactive with sulfide ion or polysulfide.

34. The electrochemical cell of claim 29, wherein said scavenger is selected from the group consisting of titanium, vanadium, niobium, molybdenum, chromium, manganese, iron, copper, nickel, cobalt, silver, cadmium, mercury, aluminum, tin, lead, arsenic, antimony, zinc, salts of titanium, salts of vanadium, salts of niobium, salts of molybdenum, salts of chromium, salts of manganese, salts of iron, salts of copper, salts of nickel, salts of cobalt, salts of silver, salts of cadmium, salts of mercury, salts of aluminum, salts of tin, salts of lead, salts of arsenic, salts in antimony, salts of zinc, alloys comprising titanium, alloys comprising vanadium, alloys comprising niobium, alloys comprising molybdenum, alloys comprising chromium, alloys comprising manganese, alloys comprising iron, alloys comprising copper, alloys comprising nickel, alloys comprising cobalt, alloys comprising silver, alloys comprising cadmium, alloys comprising mercury, alloys comprising aluminum, alloys comprising tin, alloys comprising lead, alloys comprising lead, alloys comprising arsenic, alloys comprising antimony, and alloys comprising zinc..

35. An electrochemical cell comprising an anode, a cathode, and an electrolyte
said cathode comprising a scavenger that reacts with a sulfur impurity capable of causing said cell to self-discharge, said scavenger being selected from the group consisting of vanadium, niobium, molybdenum, chromium, maganese, copper, tin, arsenic, antimony, salts of vanadium, salts of niobium, salts of molybdenum, salts of chromium, salts of maganese, salts of copper, salts of cobalt, salts of silver, salts of antimony, salts of titanium, salts of iron, salts of nickel, salts of aluminum, salts of lead, salts of zinc, alloys comprising vanadium, alloys comprising niobium, alloys comprising molybdenum, alloys comprising chromium, alloys comprising manganese, alloys comprising copper, alloys comprising cobalt, alloys comprising silver, and alloys comprising antimony.

* * * * *